(12) United States Patent
Nakajima

(10) Patent No.: US 8,127,177 B2
(45) Date of Patent: Feb. 28, 2012

(54) APPARATUS AND METHOD FOR EXECUTING WORKFLOW

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/499,443

(22) Filed: Jul. 8, 2009

(65) Prior Publication Data

US 2010/0011256 A1    Jan. 14, 2010

(30) Foreign Application Priority Data

Jul. 14, 2008   (JP) ................................. 2008-182837

(51) Int. Cl.
*G06F 11/00* (2006.01)
(52) U.S. Cl. ......................................................... 714/17
(58) Field of Classification Search .................... 399/18, 399/19; 714/17
See application file for complete search history.

(56) References Cited

U.S. PATENT DOCUMENTS

| | | | |
|---|---|---|---|
| 4,937,777 A * | 6/1990 | Flood et al. ................... | 710/107 |
| 5,247,628 A * | 9/1993 | Grohoski ....................... | 712/214 |
| 5,581,691 A * | 12/1996 | Hsu et al. ...................... | 714/15 |
| 2005/0289385 A1 * | 12/2005 | Nakaya ........................... | 714/5 |
| 2006/0274361 A1 | 12/2006 | Kobayashi et al. | |
| 2007/0016902 A1 * | 1/2007 | Shozaki et al. ............... | 717/174 |
| 2008/0313634 A1 * | 12/2008 | Matsueda ...................... | 718/100 |
| 2009/0195817 A1 * | 8/2009 | Nakajima ..................... | 358/1.15 |
| 2009/0235126 A1 * | 9/2009 | Hosouchi ........................ | 714/57 |

FOREIGN PATENT DOCUMENTS

| | | |
|---|---|---|
| JP | 2004-280665 A | 10/2004 |
| JP | 2006-338544 A | 12/2006 |

* cited by examiner

*Primary Examiner* — Robert Beausoliel, Jr.
*Assistant Examiner* — Neil Miles
(74) *Attorney, Agent, or Firm* — Canon USA Inc. IP Division

(57) ABSTRACT

If an error occurs during workflow processing, the present invention interrupts job processing appropriately while dispersing a load to the devices. When executing a plurality of processing steps with a plurality of devices in accordance with workflow setting information that defines the sequence of processing, a workflow execution method of the present invention includes the steps of: interrupting the processing step being executed when an error occurs in a first device; searching the workflow setting information including the processing step in the first device in which the error has occurred; specifying a second device in which another processing step included in the searched workflow setting information is executed; giving a notification that the error has occurred in the first device to the second device; restarting the interrupted processing step when the first device is recovered; and giving a notification that the first device has recovered to the second device.

14 Claims, 15 Drawing Sheets

FIG. 5A

```xml
<?xml version="1.0" encoding="UTF-8" ?>
-<WORKFLOW>
  <FLOWID>0001</FLOWID>
-<PROCESS>
  <TOTAL>3</TOTAL>
-<PROCESS1>
  <NAME>AAA</NAME>
  <DEST_DEVICE>DeviceA</DEST_DEVICE>
  <DEST_ADDRESS>xxx.xxx.xxx.xxx</DEST_ADDRESS>
  <DEST_PATH>Folder00</DEST_PATH>
  <NOTIFY>1</NOTIFY>
  </PROCESS1>
-<PROCESS2>
  <NAME>BBB</NAME>
  <DEST_DEVICE>DeviceB</DEST_DEVICE>
  <DEST_ADDRESS>xxx.xxx.xxx.xxx</DEST_ADDRESS>
  <DEST_PATH>Folder05</DEST_PATH>
  <NOTIFY>1</NOTIFY>
  </PROCESS2>
-<PROCESS3>
  <NAME>CCC</NAME>
  <DEST_DEVICE>DeviceC</DEST DEVICE>
  <DEST_ADDRESS>xxx.xxx.xxx.xxx</DEST_ADDRESS>
  <DEST_PATH>Folder03</DEST_PATH>
  <NOTIFY>1</NOTIFY>
  </PROCESS3>
  </PROCESS>
      ⋮
```

FIG. 5B

```
<?xml version="1.0" encoding="UTF-8" ?>
-<WORKFLOW>
  <FLOWID>0001</FLOWID>
-<PROCESS>
  <TOTAL>3</TOTAL>
-<PROCESS1>
  <NAME>DDD</NAME>
  <DEST_DEVICE>DeviceD</DEST_DEVICE>
  <DEST_ADDRESS>xxx.xxx.xxx.xxx</DEST_ADDRESS>
  <DEST_PATH>Folder02</DEST_PATH>
  <NOTIFY>1</NOTIFY>
  </PROCESS1>
-<PROCESS2>
  <NAME>BBB</NAME>
  <DEST_DEVICE>DeviceB</DEST_DEVICE>
  <DEST_ADDRESS>xxx.xxx.xxx.xxx</DEST_ADDRESS>
  <DEST_PATH>Folder05</DEST_PATH>
  <NOTIFY>1</NOTIFY>
  </PROCESS2>
-<PROCESS3>
  <NAME>CCC</NAME>
  <DEST_DEVICE>DeviceC</DEST DEVICE>
  <DEST_ADDRESS>xxx.xxx.xxx.xxx</DEST_ADDRESS>
  <DEST_PATH>Folder03</DEST_PATH>
  <NOTIFY>1</NOTIFY>
  </PROCESS3>
  </PROCESS>
      ⋮
```

500b

APPARATUS AND METHOD FOR EXECUTING WORKFLOW

BACKGROUND OF THE INVENTION

1. Field of the Invention

The present invention relates to an apparatus and a method for executing workflows for processing jobs each including a plurality of processing steps in accordance with workflow setting information.

2. Description of the Related Art

There are commercially practical multifunction devices (digital multifunction devices) in which digital copy machines each incorporate the functions of a printer, a scanner, a facsimile machine, etc. The known digital multifunction devices perform facsimile communications using their own scanner and printer and perform printing using their own printer by expanding code data sent from a computer to bitmap data. The known digital multifunction devices transmit images read from the scanner using the scanner over a network and print images delivered over the network using the printer.

Some of the known digital multifunction devices have a so-called box function of assigning recording regions in its storage unit to a user and departments so that the user can store image data in the recording region and output it as appropriate.

Workflow execution apparatuses that execute a workflow with a plurality of digital multifunction devices connected to a network have been proposed in related art. In the related-art workflow executing apparatuses, for example, in an application approving flow, an applicant transmits application data to an approver's box. On reception of the data, the approver approves it and transmits the data to the next approver. The last approver sends notification of approval to the applicant and stores the application in a designated server.

The known workflow execution apparatuses can also execute processing using different functions with individual devices connected to a network. For example, a first device executes a scan and transmits scan data to a second device. The second device that has received the scan data executes image analysis processing, such as optical character recognition (OCR), and transmits the result to a third device. The third device that has received the result performs the process of outputting it to a paper medium or registering it in a server.

A known workflow execution apparatus is provided with a server that centrally controls over a workflow, where it controls the state of execution devices and jobs. If an error occurs in any of the devices, the server temporarily stores the job and monitors the status thereof to thereby reduce a load on the device (refer to Japanese Patent Laid-Open No. 2004-280665).

Another known workflow execution apparatus is proposed in which if an error occurs in processing a workflow, the workflow is continued by executing the process with another device (Japanese Patent Laid-Open No. 2006-338544).

However, in the known workflow execution apparatuses, if an error occurs in some of the workflow execution devices, the workflow processing stops. In an application approving flow, examples of the error are halting of an authentication server for authenticating the user, impossibility of transmitting an application due to a network failure, and lack of the capacity of a storage unit arising from the amount used exceeding a predetermined threshold. In a workflow in which individual devices execute processing using different functions, the error includes, for example, impossibility of printing due to the absence of an appropriate sheet prepared, impossibility of printing due to a shortage of toner.

If an error occurs in a device, the job of the workflow may be put into standby mode until the error is corrected, and after recovery, the job may be restarted. However, this has a first problem in that if the processing of other workflows is executed one after another without waiting for recovery from the error, a large amount of jobs are accumulated in the error device, thus applying a load thereon.

The known workflow execution apparatus equipped with a server that centrally controls workflows to reduce loads on the devices has a second problem of complicated system configuration and maintenance because the server is needed.

The known workflow execution apparatus that can continue workflow processing even after the occurrence of an error has a third problem in that a separate alternative device is needed, which needs a complicated work for construction, and that the alternative device cannot execute completely the same processing unless the alternative device has the same configuration as the error device.

SUMMARY OF THE INVENTION

The present invention can provide an apparatus and a method for executing a workflow in which even if an error occurs during processing of the workflow, the processing of the job can be interrupted appropriately while a load on the devices is dispersed.

According to a first aspect of the present invention, there is provided a workflow execution apparatus that processes a plurality of processing steps in accordance with workflow setting information that defines the sequence of processing, the apparatus including a searching unit configured, if an error has occurred in any of the processing steps of a first device, to search the workflow setting information including the processing step in which the error has occurred; a device specifying unit configured to specify a second device in which another processing step included in the searched workflow setting information is executed; an error notifying unit configured to transmit an error notification to the second device; a processing restarting unit configured to restart the interrupted processing step when it is recovered from the error; and a recovery notifying unit configured to transmit a recovery notification to the second device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a diagram showing an example of workflow setting information according to the first embodiment of the present invention.

FIG. 5B is a diagram showing an example of workflow setting information according to the first embodiment of the present invention.

DESCRIPTION OF THE EMBODIMENTS

Embodiments of the present invention for achieving a workflow execution apparatus and a method for the same will now be described in detail in accordance with the accompanying drawings.

First Embodiment

Figure 1:
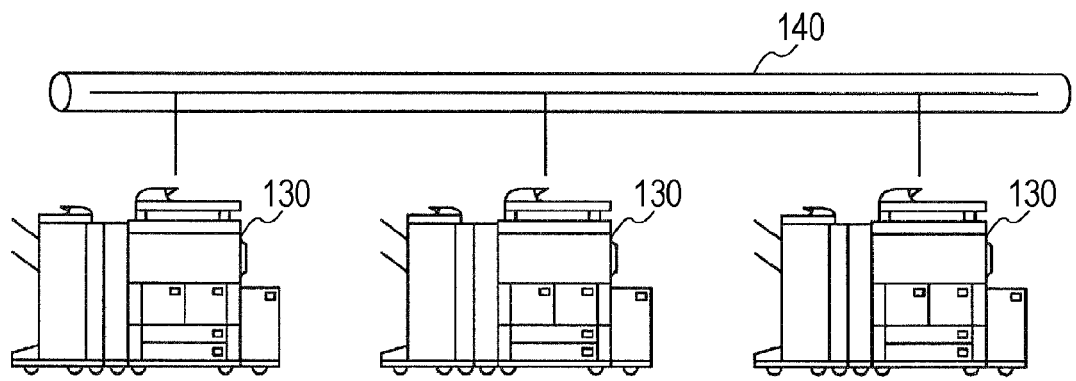
FIG. 1 is a diagram illustrating the configuration of a workflow system according to a first embodiment of the present invention.

FIG. 1 shows the overall configuration of a workflow system 100 according to a first embodiment of the present invention. The workflow system 100 is constituted of a plurality of digital multifunction devices 130 and a network 140 that connects the plurality of digital multifunction devices 13.

Figure 2:
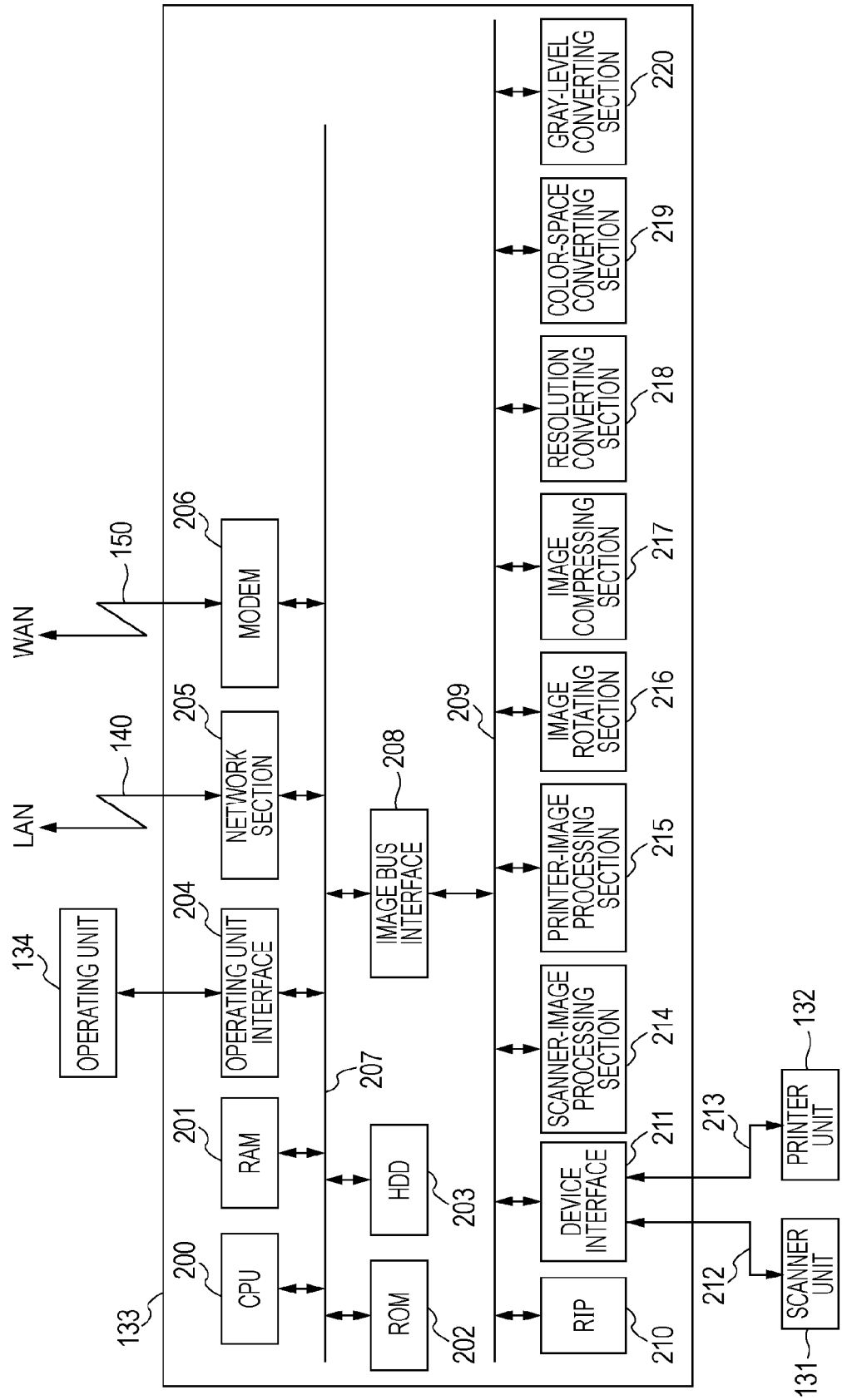
FIG. 2 is a block diagram showing the configuration of a digital multifunction device according to the first embodiment of the present invention.

FIG. 2 is a block diagram showing the configuration of one of the digital multifunction devices 130 which are workflow execution apparatuses according to the first embodiment of the present invention. The digital multifunction device 130 processes a job including a plurality of processing steps in accordance with workflow setting information that defines the sequence of the processing. The digital multifunction device 130 includes an operating unit 134, a controller 133, a scanner unit 131 for inputting an image, and a printer unit 132 for outputting the image.

The controller 133 is connected to the scanner unit 131 and the printer unit 132 and to a network (LAN) 140 and a public line (WAN) 150. The controller 133 controls the input and output of image information and device information.

The controller 133 includes a CPU 200, a RAM 201, a ROM 202, and a hard disk drive (hereinafter referred to as a HDD) 203. The CPU 200 controls the entire system. The RAM 201 is a system work memory for the CPU 200 to operate and also serves as an image memory (buffer memory) for temporarily storing input image data. The ROM 202 is a boot ROM, in which a boot program for the system is stored. The HDD 203 stores system software, image data, and workflow setting information.

The controller 133 further includes an operating unit interface 204, a network section 205, a modem 206, and a system bus 207. The operating unit interface 204 is an interface with the operating unit 134 and outputs image data to be displayed on the operating unit 134 and information on the image data to the operating unit 134. The operating unit interface 204 transmits information that is input by an operator inputs through the operating unit 134 to the CPU 200. The network section 205 is connected to the network (LAN) 140 to input and output information. The modem 206 is connected to the public line (WAN) 150 to input and output image information. The system bus 207 connects the CPU 200, the RAM 201, the ROM 202, the HDD 203, the operating unit interface 204, the network section 205, and the modem 206 together.

The controller 133 further includes an image bus interface 208, an image bus 209, a raster image processor (RIP) 210, a device interface 211, a scanner-image processing section 214, and a printer-image processing section 215. The image bus interface 208 is a bus bridge that connects the system bus 207 and the image bus 209 that transfers image data at high speed to convert the data structure. The image bus 209 is formed of a PCI bus or an IEEE1394 bus.

The raster image processor (RIP) 210 expands PDL code to a bitmap image. The device interface 211 connects the scanner unit 131 and the printer unit 132 with the controller 133 through an image-input-section interface 212 and a print-section interface 213, respectively, to convert image data between synchronous data and asynchronous data. The scanner-image processing section 214 corrects, processes, and edits input image data. The scanner-image processing section 214 determines whether an input image is a color document or a monochrome document from a saturation signal of the image and holds the result. The printer-image processing section 215 corrects, processes, and edits output image data.

The controller 133 further includes an image rotating section 216, an image compressing section 217, a resolution converting section 218, a color-space converting section 219, and a gray-level converting section 220. The image rotating section 216 rotates an image upon reading the image from the scanner unit 131 in cooperation with the scanner-image processing section 214 and stores it in the memory. The image rotating section 216 also rotates an image stored in the memory and stores it. The image rotating section 216 also rotates an image stored in the memory and prints it in cooperation with the printer-image processing section 215.

The image compressing section 217 performs compressing or expanding processing, JPEG for multivalued image data and JBIG, MMR, MR, or MH for binary image data. The resolution converting section 218 converts the resolution of an image stored in the memory and stores it in the memory. The color-space converting section 219 converts, for example, a YUV image stored in the memory to a Lab image by matrix operation and stores it in the memory. The gray-level converting section 220 converts, for example, an 8-bit 256-gray-level image stored in the memory to a 1-bit 2-gray-level image by error diffusion or the like and stores it in the memory.

The image rotating section 216, the image compressing section 217, the resolution converting section 218, the color-space converting section 219, and the gray-level converting section 220 can be operatively connected; for example, when rotating an image stored in the memory or converting the resolution thereof, both of the processing can be performed without the use of the memory.

The image bus 209 connects the image bus interface 208, the image bus 209, the RIP 210, the device interface 211, the scanner-image processing section 214, the printer-image processing section 215, the image rotating section 216, the image compressing section 217, the resolution converting section 218, the color-space converting section 219, and the gray-level converting section 220 together.

Figure 3:
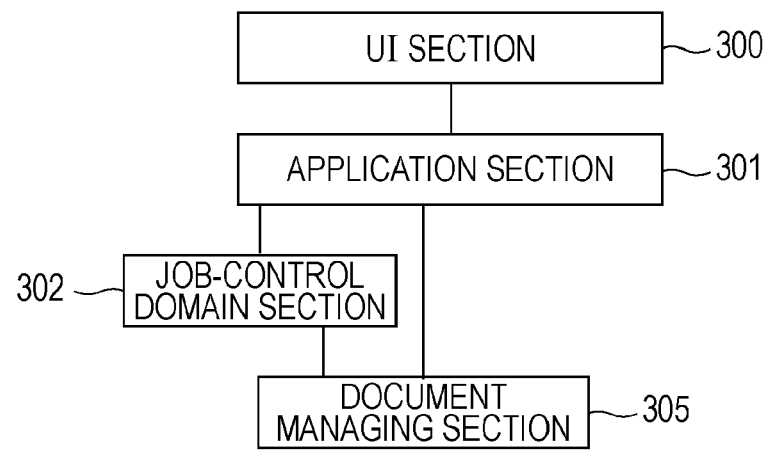
FIG. 3 is a block diagram showing the functional configuration of the system software of the digital multifunction device which is a workflow execution apparatus according to the first embodiment of the present invention.

FIG. 3 is a block diagram showing the functional configuration of the system software of the controller 133 of the digital multifunction device 130 shown in FIG. 2. The system software is stored in the HDD 203 in FIG. 2. The CPU 200 loads the system software from the HDD 203 to the RAM 201 and executes it.

A user-interface section (UI section) 300 provides information input by a user to an application section 301, receives the result of processing from the application section 301, and generates a screen to be displayed on the operating unit 134.

The application section 301 performs processing in accordance with a request from the user-interface section 300. When a request, such as scanning or printing, is given from the user-interface section 300, the application section 301 inputs the job together with designated settings to a job-control domain section 302 and receives information on the state of the device and the status of the job from the job-control domain section 302. When a request for referring to or editing accumulated documents is given, the application section 301 gives an instruction to obtain or change the information thereof to a document managing section 305 and receives the information, such as a list of the documents or attributes thereof, from the document-managing section 305.

The job-control domain section 302 controls the processing of jobs, such as a scan job, a copy job, a print job, and a fax job. The document-managing section 305 manages image data as a document.

Referring to FIG. 2, the HDD 203 has a so-called box function of storing system software, image data, and workflow setting information, as well as general data files, such as data for managing images.

The HDD 203 can be provided with folders, in which image data files and general data files can be stored. The folders include a region that the workflow system 100 can access only internally and a user accessible region. The user can store image data etc. in folders in the accessible region and can refer to, edit, delete, or output the stored image.

Figure 4:
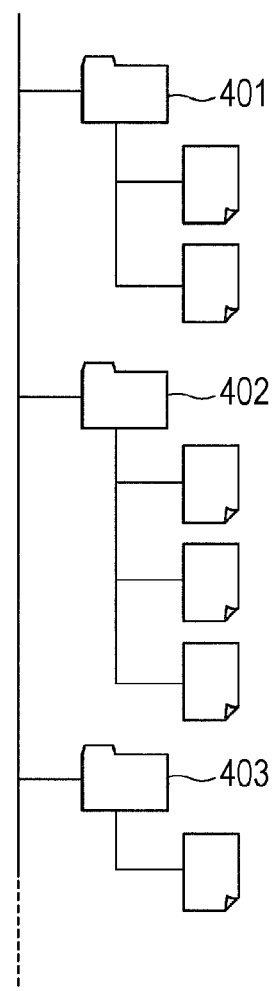
FIG. 4 is a diagram showing an example of folders in a user accessible region according to the first embodiment of the present invention.

FIG. 4 shows an example of the folders in the user accessible region. The folders shown in FIG. 4 are created in the HDD 203 of the digital multifunction device 130. This region includes a folder 401, a folder 402, and a folder 403. The folder 401 stores two pieces of data, the folder 402 stores three pieces of data, and the folder 403 stores one piece of data. The number of folders is not limited to three, and the folders may have a hierarchical structure.

Data is stored in the folders 401 to 403 as follows. The scanner unit 131 reads an image and stores obtained image data in the folders 401 to 403. As an alternative, another client computer connected to the workflow system 100 generates image data from an application document using a printer driver, and the mage data is stored in the folders 401 to 403. As another alternative, a client computer makes a direct access to the folders 401 to 403 using a protocol, such as FTP, SMB, or WebDAV, and stores data.

A user can refer to the folders 401 to 403 and the stored image data using the operating unit 134. The image data is handled as a document according to the management of the system software. In the case where a plurality of folders or a plurality of documents is present, the operating unit 134 displays a list of the folders or the documents. The user can select a document from the document list and can execute operations on the document. The user can execute processing, such as displaying a preview, displaying properties, inserting a page, moving or copying the document to another folder, deleting the document, or printing the document.

An application workflow in the workflow execution apparatus of the first embodiment will be described. The application workflow is executed in accordance with workflow setting information that is preset in the digital multifunction device 130. That is, the workflow setting information defines the sequence of a plurality of processing steps that constitute a job. FIGS. 5A and 5B show examples of the workflow setting information. Workflow setting information 500a and 500b include workflow identifying information, the sequence of processing, the destination of the document, etc. The workflow setting information 500a and 500b is stored in the HDD 203.

The workflow setting information 500a includes the following information. WORKFLOW indicates that it is workflow setting information. FLOWID indicates an ID for identifying the workflow. TOTAL indicates the number of processing steps described in this workflow setting information 500a, which indicates that the workflow in workflow setting information 500a has three processing steps. Subsequently, tags, PROCESS1, PROCESS2, and PROCESS3, and information on the individual processing steps are described thereafter.

PROCESS1 includes information below. NAME indicates the name of a subject device that executes the workflow processing. DEST_DEVICE indicates a destination device. DEST_ADDRESS indicates the IP address of the destination device. DEST_PATH indicates a destination folder. This also applies to PROCESS2 and PROCESS3.

That is, information of PROCESS1 describes that the job is transmitted to a folder 00 of DeviceA having a predetermined IP address for the processing of a subject AAA and that DeviceA executes the processing of PROCESS1.

More specifically, according to the workflow setting information 500a, when an applicant executes application processing, the document in a folder "Folder00" designated by DEST_PATH of a device A (DeviceA designated by DEST_DEVICE) for the process of approving an approver AAA designated by NAME. The approver AAA executes approving processing corresponding to PROCESS1 with reference to the document stored in the folder "Folder00" of the device A. The document subjected to the approving processing according to the workflow setting information 500a is transmitted to a folder "Folder05" of a device B for the process of approving an approver BBB designated by NAME in PROCESS2. The approver BBB executes approving processing corresponding to PROCESS2 with reference to the document stored in "Folder05" of the device B. In this way, the approving processing is performed in sequence.

The workflow setting information 500*b* shown in FIG. 5B is also described by tag information similar to the workflow setting information 500*a*.

In the workflow setting information 500*b*, when an applicant executes application processing, the document is transmitted to a folder "Folder02" designated by DEST_PATH of a device D (DeviceD) designated by DEST_DEVICE for the process of approving an approver DDD designated by NAME. The approver DDD executes approving processing corresponding to PROCESS1 with reference to the document stored in "Folder02" of the device D. The document subjected to the approving processing according to the workflow setting information 500*b* is transmitted to a folder "Folder05" of the device B for the process of approving the approver BBB designated by NAME in PROCESS2. The approver BBB executes approving processing corresponding to PROCESS2 with reference to the document stored in "Folder05" of the device B. In this way, the approving processing is executed in sequence.

Figure 6:
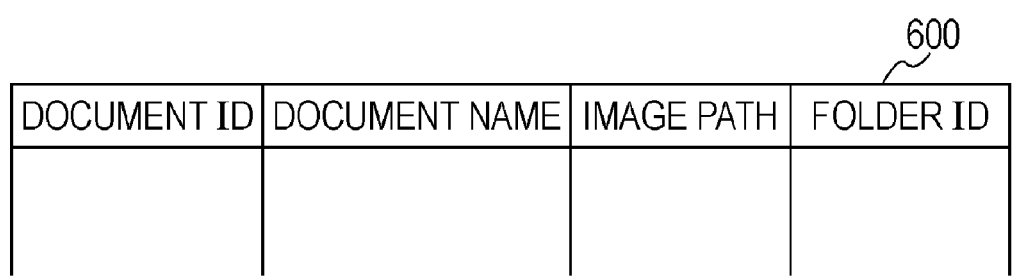
FIG. 6 is a diagram showing an example of definition of a document management table 600 according to the first embodiment of the present invention.

FIG. 6 shows an example of definition of a document management table 600 stored in the HDD 203. The document management table 600 includes a document ID for identifying a document, a document name, an image path for storing an image, and the ID of a parent folder in which the document is stored.

Figure 7:
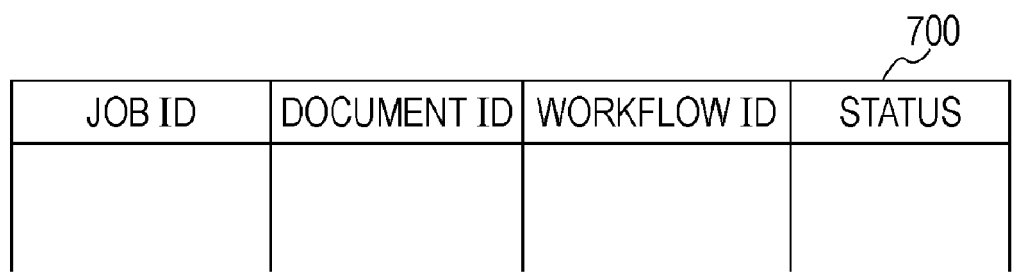
FIG. 7 is a diagram showing an example of definition of a job table according to the first embodiment of the present invention.

FIG. 7 shows an example of definition of a job table 700 store in the HDD 203. The job table 700 includes a job ID for identifying a job, the ID of a document to which the job is performed, a workflow ID corresponding to the job, and a status showing the status of the job.

The above-described workflow setting information is shown by way of example; it should define the sequence of processing of a job constituted of a plurality of processing steps; it may be described in another form or another recording format. As an alternative, the HDD 203 may also have a plurality of pieces of workflow setting information having different settings.

Figure 8:
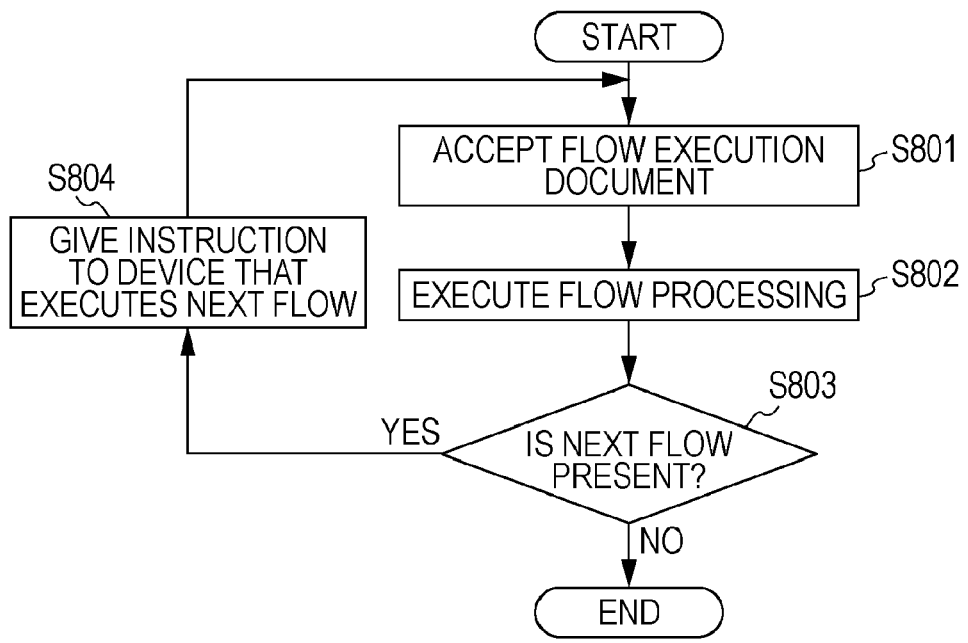
FIG. 8 is a flowchart describing the fundamental processing steps of an application workflow according to the first embodiment of the present invention.

FIG. 8 is a flowchart describing the fundamental processing steps of an application workflow of the workflow system 100 according to an embodiment of the present invention. The processing steps of the flowchart are performed for the individual digital multifunction devices 130 in the workflow system 100. The processing in the flowchart in FIG. 8 is achieved when the CPU 200 shown in FIG. 2 loads the system software stored in the HDD 203 on the RAM 201 and executes it.

First, the digital multifunction device 130 accepts a document for which the workflow is to be executed (S801). If the digital multifunction device 130 is a device that is directly operated by an applicant, the document is a document accepted in accordance with an application start instruction given from the operating unit 134. If the digital multifunction device 130 is a device that is operated by an approver, the document is a document transmitted from the applicant or the previous approver.

Upon reception of the document, the system software of the digital multifunction device 130 executes the following workflow processing (S802). Examples of the processing include the processing that an approver authenticates the device, approving an application, and transmitting the application to the next approver. At that time, the status of the corresponding job in the job table is "during processing (that is, during execution of the job)". Subsequently, it is determined whether the next workflow processing has been predetermined on the basis of workflow setting information (S803). If the next workflow processing has been predetermined, an instruction is given to the digital multifunction device 130 that is to execute the next workflow processing (S804). If the next workflow processing has not been predetermined, the processing is terminated. When the processing ends, the status of the corresponding job in the job table indicates "completion of processing".

Figure 9:
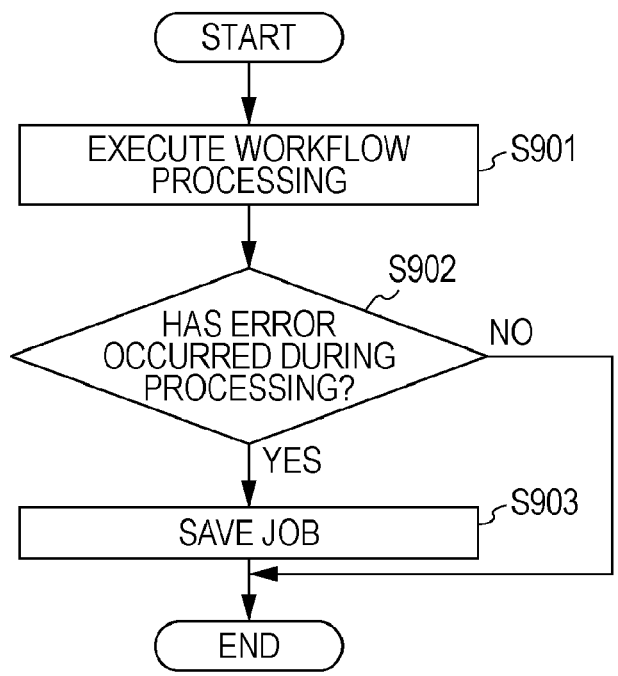
FIG. 9 is an example of a flowchart describing processing steps when an error occurs during the execution of a workflow according to the first embodiment of the present invention.

FIG. 9 is an example of a flowchart describing processing steps when an error occurs in the digital multifunction device 130 during execution of a workflow in the first embodiment.

The CPU 200 shown in FIG. 2 loads the system software stored in the HDD 203 into the RAM 201 and executes the following processing.

The workflow processing is executed (S901). If no error is detected during the execution, the processing is terminated (S902: No). If an error is detected, the running job is stored (S903: Yes). The CPU 200 in step S903 functions as a processing interrupting unit that interrupts the processing step being executed when an error occurs. The CPU 200 In step S903 also functions as a job saving unit that saves the interrupted processing step as a job.

The job saving unit saves a document to be processed in a specified region of the HDD 203, records the job ID, the document ID, and the workflow ID in the job table, and changes the status to "interrupted". Thereafter, an error notification is given to the previous device that executed the workflow processing before (see FIG. 10). In the first embodiment, the user is not given an error notification; however, the user can be given the error notification.

Interruption Processing

Figure 10:
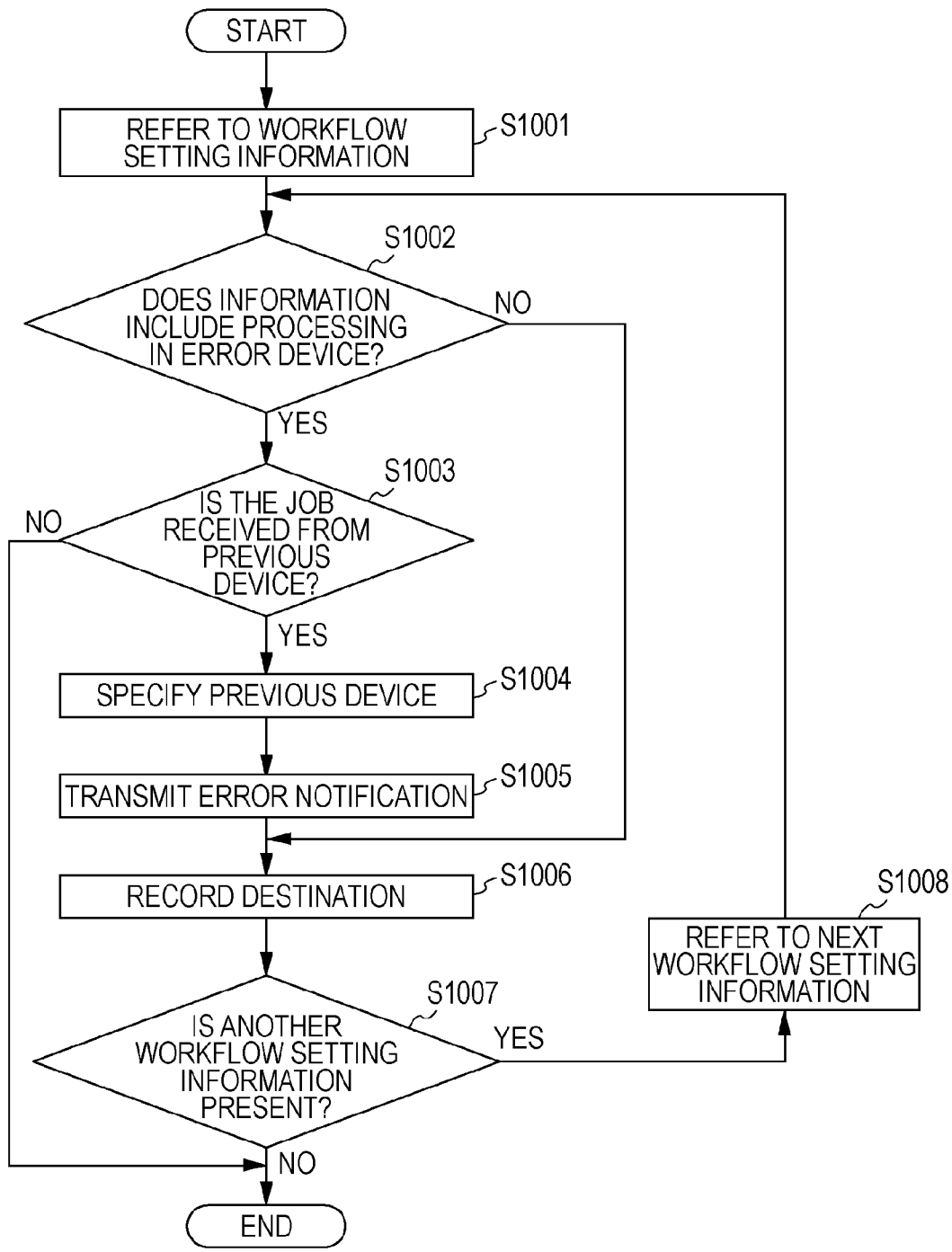
FIG. 10 is a flowchart describing the processing of making a notification that an error has occurred in workflow processing according to the first embodiment of the present invention.
Figure 11:
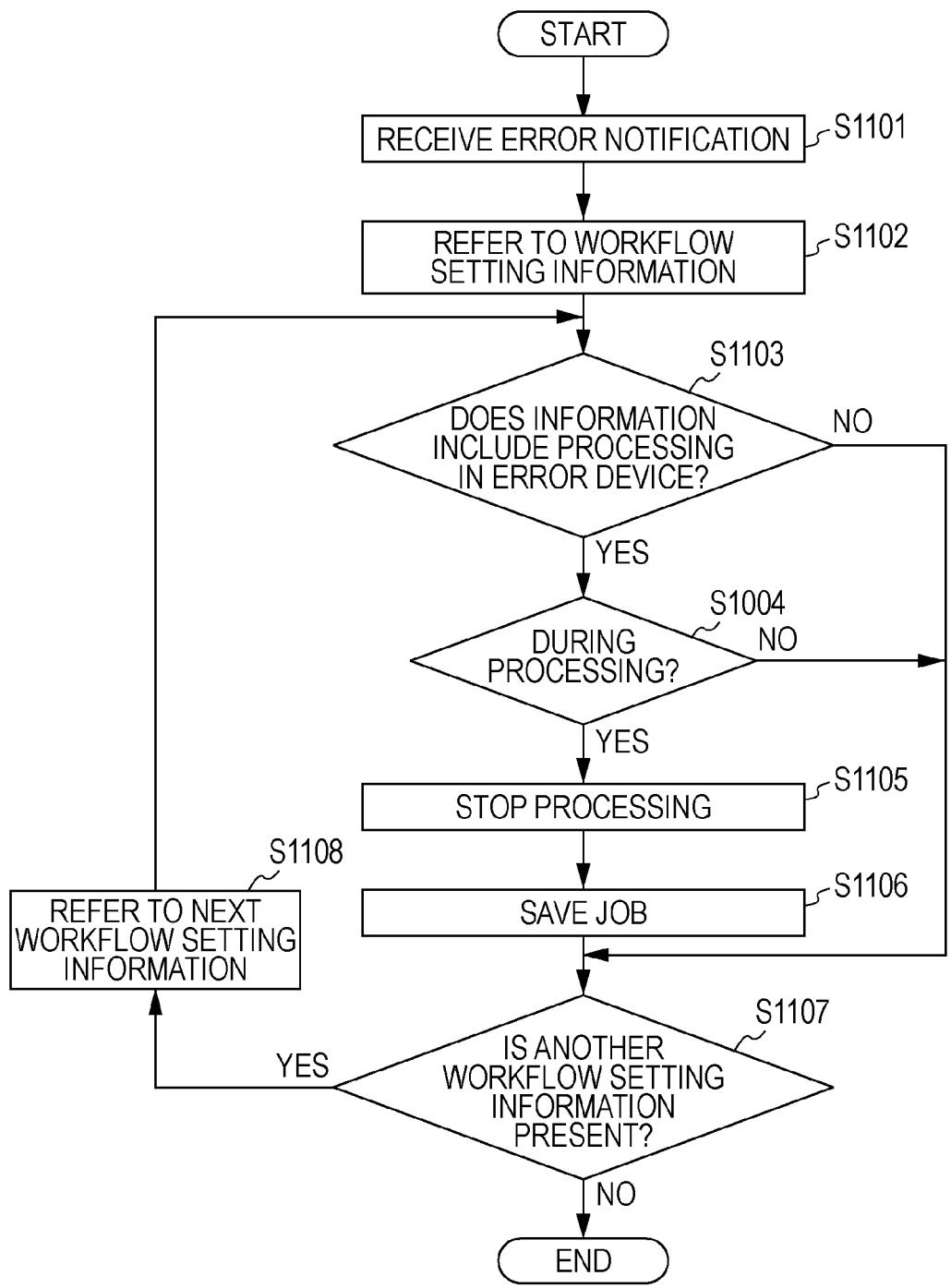
FIG. 11 is a flowchart describing the processing steps of a device that has received the error notification according to the first embodiment of the present invention.

In the workflow system 100 of the first embodiment, the interruption of workflow processing includes the process of transmitting an error notification by the first device (see FIG. 10) and processing by a second device that has received the error notification (FIG. 11).

FIG. 10 is a flowchart describing the process of making a notification that an error has occurred in workflow processing in the first embodiment. The CPU 200 shown in FIG. 2 loads the system software stored in the HDD 203 into the RAM 201 and executes the following processing.

First, the CPU 200 refers to workflow setting information stored in the HDD 203 (S1001) and determines whether the referred workflow setting information is workflow setting information including processing in an error device (S1002). For example, if an error has occurred in DeviceC, it is determined that the workflow setting information 500*a* includes processing of the error device because DeviceC is designated by DEST_DEVICE of PROCESS3 in the workflow setting information 500*a* shown in FIG. 5A. The CPU 200 in step S1002 functions as a searching unit that searches for workflow setting information including an error processing step.

As a result of searching by the searching unit in step S1002, if the workflow setting information does not include processing in the error device, the process moves to S1006. In contrast, if the workflow setting information includes processing in the error device, the CPU 200 further refers to the workflow setting information and determines whether the job is received from another device (S1003). For example, if an error has occurred in DeviceC, it is determined that the job is received from DeviceB because DeviceB is designated by DEST_DEVICE of PROCESS2 in the workflow setting information 500*a* shown in FIG. 5A.

If the job is not received from another device, the processing is terminated (S1003: No). In contrast, if the job is received from another device, the device that has transmitted the job is specified (S1004). For example, if an error has occurred in deviceC, it is determined that the job is received from DeviceB because DeviceB is designated by DEST_DE- VICE of PROCESS2 in the workflow setting information 500a shown in FIG. 5A. The CPU 200 in step S1004 functions as a device specifying unit that specifies another device that executed the previous processing step. An error notification is transmitted to the device specified by the device specifying unit (S1005). According to the workflow setting information 500a, if an error has occurred in DeviceC, the DeviceC transmits an error notification to DeviceB. The CPU 200 in step S1005 functions as an error notifying unit that transmits the error notification to another device.

The error notification transmitted from the error notifying unit includes a workflow ID and information that specifies the device, such as an IP address and a device ID. Subsequently, the CPU 200 stores information on the destination device (S1006). The CPU 200 in step S1006 functions as a storage unit that stores the destination device to which the error notification is transmitted.

Subsequent to the storage by the storage unit, it is determined whether another workflow setting information is stored in the device (S1007). If another workflow setting information is stored (S1007: Yes), the CPU 200 refers to the workflow setting information (S1008) and moves to S1002. For example, the processing steps following step S1002 are executed also for the workflow setting information 500b shown in FIG. 5B. The workflow setting information 500b includes processing of DeviceC in PROCESS3. It is determined that the device that has transmitted the job is DeviceB, so that DeviceC transmits an error notification to DeviceB. If no other workflow setting information is stored, the processing is terminated (S1007: No). DeviceB that has received the error notification executes the same processing. DeviceB transmits the error notification to DeviceD designated by DEST_DEVICE of PROCESS1 in accordance with the workflow setting information 500b. In this way, the error notification is transmitted through the plurality of devices from one device to another.

FIG. 11 is a flowchart describing the processing steps of the second device that has received the error notification of the workflow processing in the first embodiment.

The CPU 200 shown in FIG. 2 loads the system software stored in the HDD 203 into the RAM 201 and executes the following processing.

First, the digital multifunction device 130 receives the error notification from another device (S1101). The CPU 200 in step S1101 functions as a notification receiving unit that receives a notification that an error has occurred. After the reception by the notification receiving unit, the CPU 200 refers to workflow setting information stored in the HDD 203 (S1102). It is determined whether the referred workflow setting information includes processing of the error device (S1103).

If the workflow setting information does not include processing of the error device, then the process moves to S1107. If the workflow setting information includes processing of the error device, then the CPU 200 determines whether the job based on the workflow setting information is being executed by the device (S1104). The CPU 200 in step S1104 functions as a determining unit that determines whether the processing step is being executed.

That is, in step S1104, that is, the determining step, the CPU 200 specifies a job whose status is "during processing" from the job table and determines whether the job is processed in accordance with the referred workflow setting information using the workflow ID. If a running job is not present, then the process moves to step S1107 (S1104: No). If a running job is present, the processing of the job is interrupted (S1105). The CPU 200 in step S1105 functions as a processing interrupting unit that interrupts the processing step being executed.

Subsequently, the job during processing is saved in the HDD 203 (S1106). The CPU 200 in step S1106 functions as a job saving unit that saves the interrupted processing step as a job. The job saving unit saves a document to be processed in a specified region of the HDD 203 and changes the status in the job table "interrupted". The CPU 200 in step S1106 functions as a processing interrupting unit that interrupts the processing step being executed when an error occurs.

Subsequently, it is determined whether another workflow setting information is stored (S1107). If another workflow setting information is stored (S1107: Yes), the CPU 200 refers to the next workflow setting information. If another workflow setting information is not stored (S1107: No), the processing is terminated.

Subsequently, the CPU 200 transmits the notification also to the device that has executed the workflow processing before. Since the operation of the notification is the same as that described in the flowchart in FIG. 10, a detailed description thereof will be omitted.

As described above, the workflow processing is interrupted by the processing of error notification shown in FIG. 10 and the processing of the device that has received the error notification shown in FIG. 11.

Figure 12:
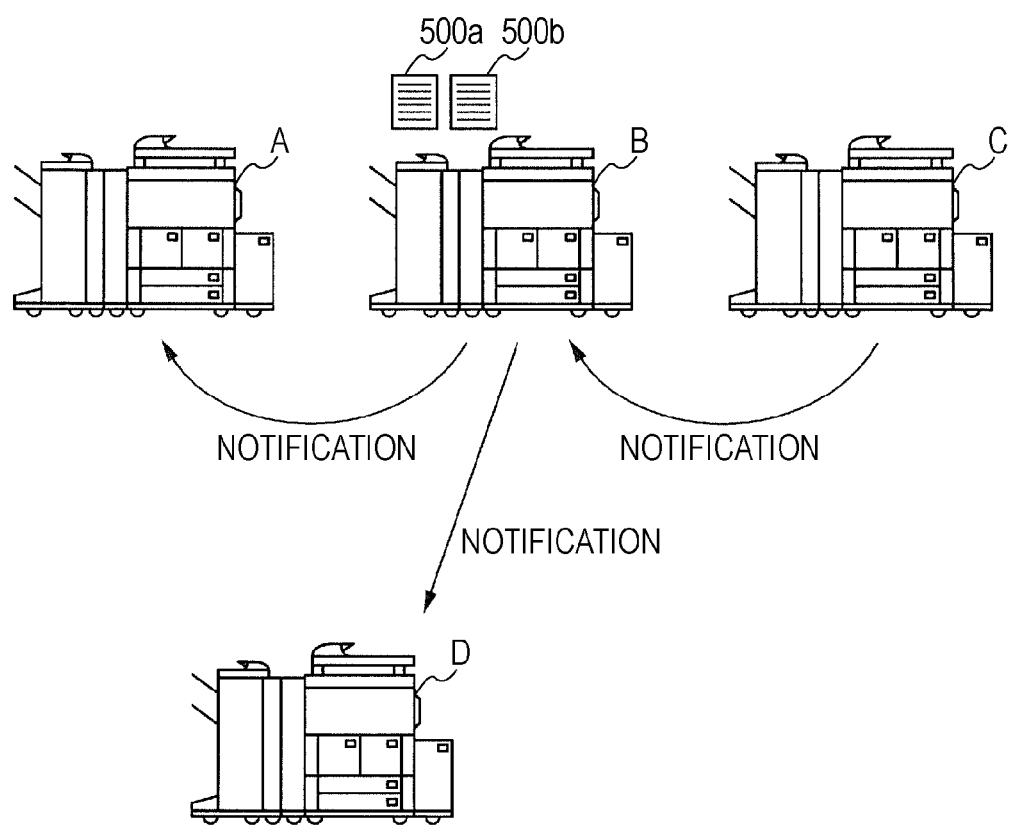
FIG. 12 is a diagram describing the operation of interrupting workflow processing according to the first embodiment of the present invention.

FIG. 12 is a diagram describing the operation of interrupting the workflow processing in the first embodiment.

In the device B (DeviceB in FIG. 5A), the two workflow setting information 500a and 500b are set. If the remaining capacity of the HDD 203 decreases during the processing of the device C (DeviceC in FIG. 5A, for example, a first device) to cause an error, the device C designated by DEST_DEVICE of PROCESS3 transmits an error notification to the device B (for example, a second device) which is DEST_DEVICE of PROCESS2. Upon reception of the error notification, the device B specifies workflow setting information that includes processing in the error device (that is, the device C) with reference to the stored workflow setting information.

The workflow setting information 500a and 500b include processing in the device C. Therefore, when processing of the workflow setting information 500a or 500b is executed by the device B, for example, the workflow processing is not transmitted to the next device, and the job is stored as an interrupted state. Devices in which the processing of the workflow setting information 500a and 500b was executed before are the device A which is DEST_DEVICE of PROCESS1 in the workflow setting information 500a and a device D (DeviceD in FIG. 5B) which is DEST_DEVICE of PROCESS1 in the workflow setting information 500b. Accordingly, the device C transmits the error notification to the device A and the device D.

Recovery Processing

Figure 15:
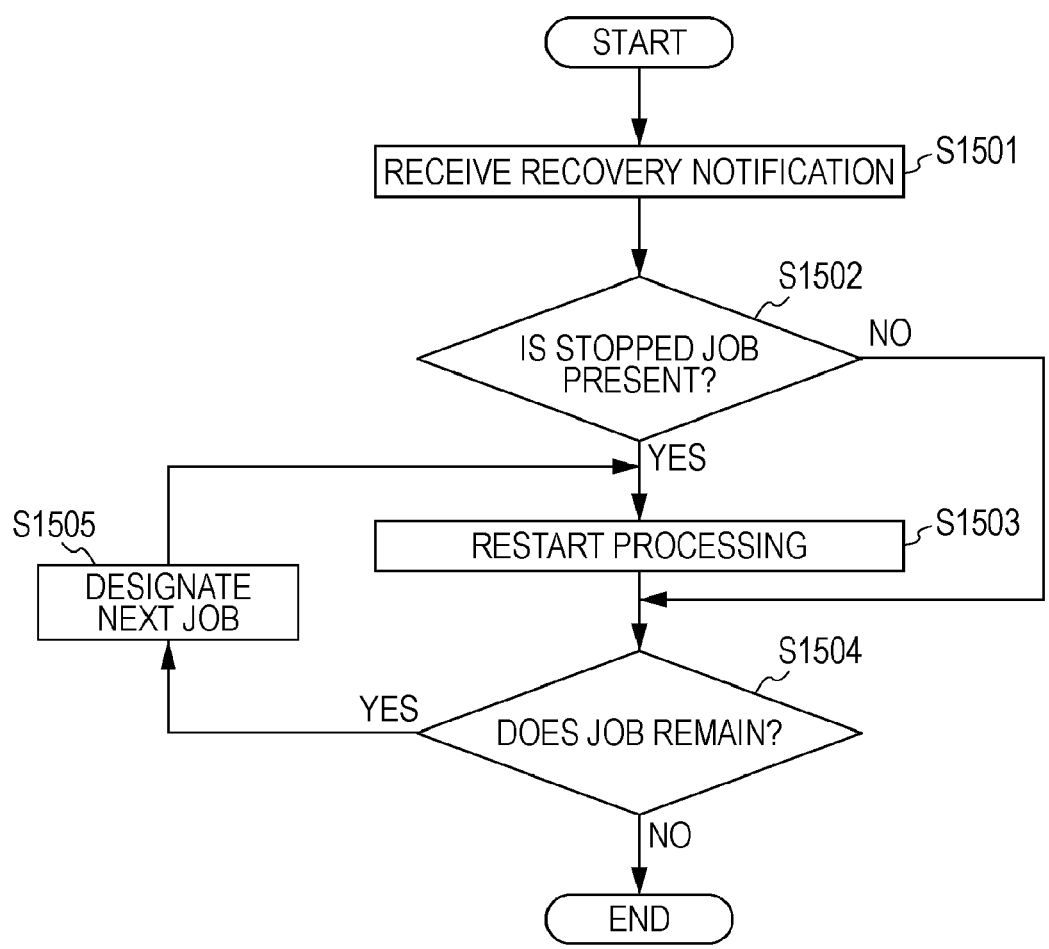
FIG. 15 is a flowchart describing the processing of a workflow execution apparatus that has received the recovery notification according to the first embodiment of the present invention.

In the workflow system 100 according to the first embodiment, the recovery of the workflow processing includes the process of restarting the processing of an interrupted job (see FIG. 13), the process of transmitting a recovery notification (see FIG. 149, and the processing of a device that has received the recovery notification (see FIG. 15).

Figure 13:
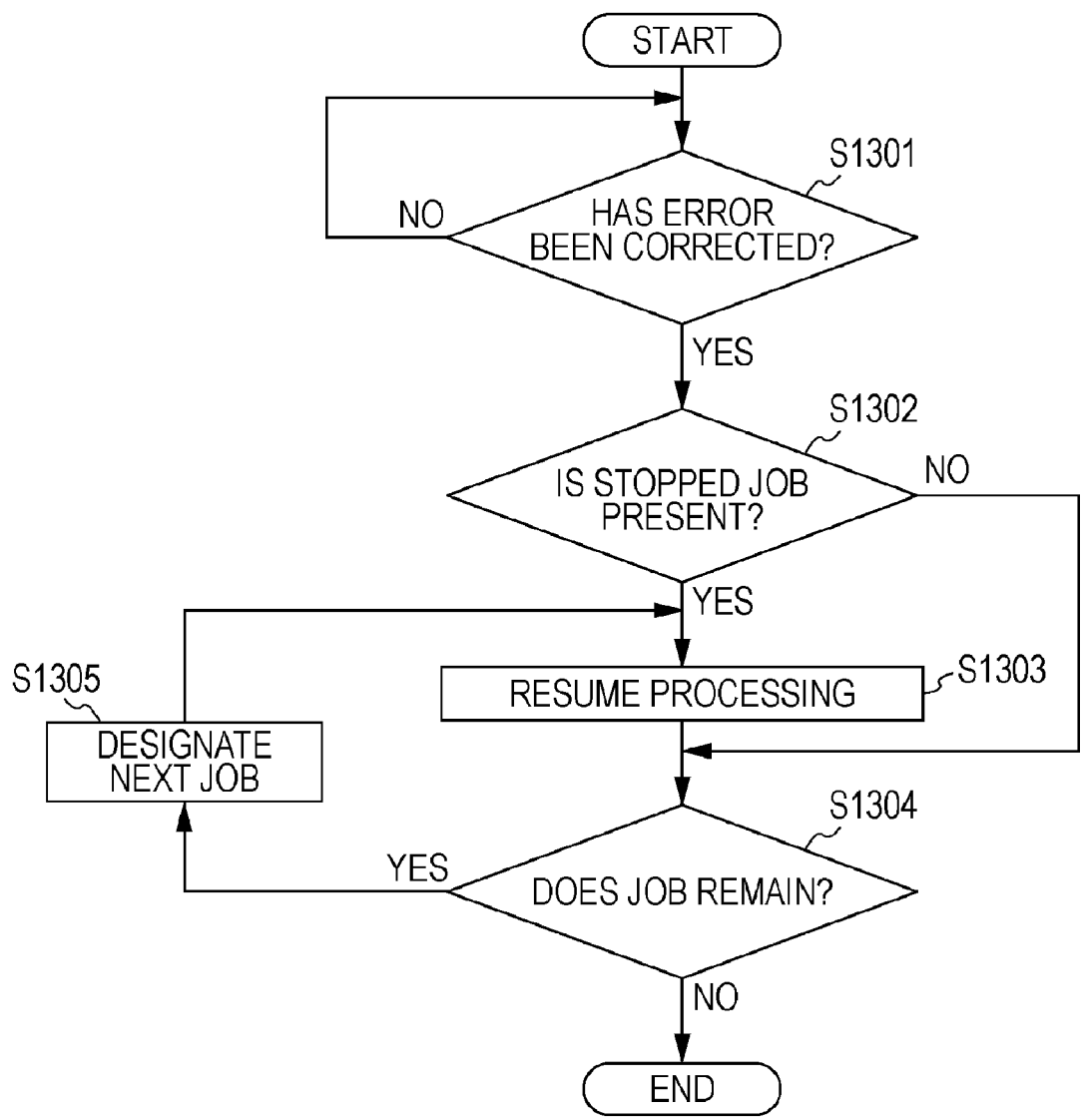
FIG. 13 is a flowchart describing the restart of processing at the recovery according to the first embodiment of the present invention.

FIG. 13 is a flowchart describing processing steps including a job restarting processing when an error is corrected in the first embodiment. The CPU 200 shown in FIG. 2 loads the system software stored in the HDD 203 into the RAM 201 and executes the following processing.

When the recovery of a device from an error is detected (S1301), it is determined whether there is a job whose status is "interrupted" from the job table (S1302). If there is no interrupted job (S1302: No), the process moves to step S1304. In contrast, if there is an interrupted job (S1302: Yes), the processing of the job is restarted (S1303). The CPU 200 in step S1303 functions as a processing restarting unit that restarts the interrupted processing step when the job is recovered from the error.

After the restart by the processing restarting unit, it is determined whether another interrupted job remains (S1304). If an interrupted job remains (S1304: Yes), the next job is designated (S1305), and processing of the job is restarted. If no job remains (S1304: No), the process is terminated. Subsequently a recovery notification by a recovery notifying unit is transmitted to the previous device that executed the workflow processing before through the network section 205, as will be described in FIG. 14.

Figure 14:
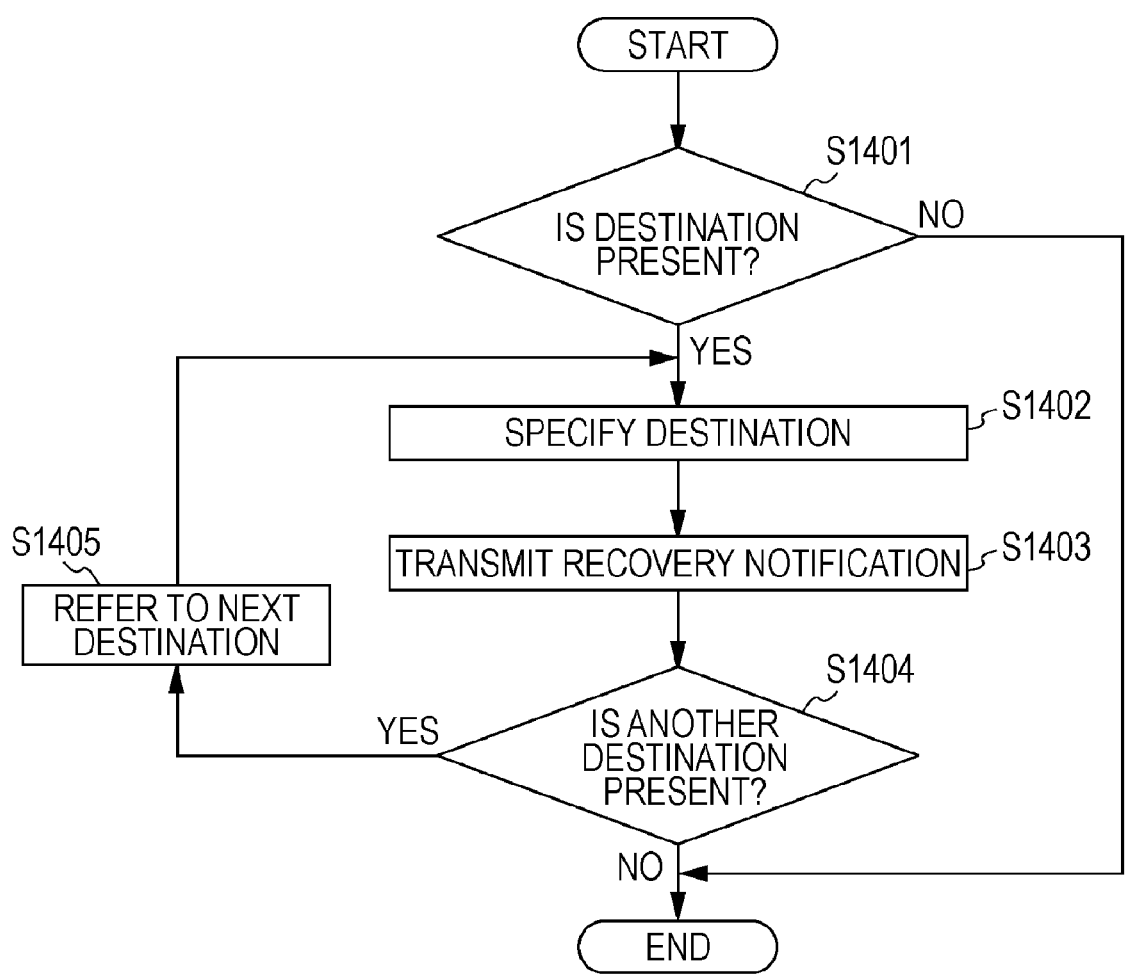
FIG. 14 is a flowchart describing the process of making a recovery notification according to the first embodiment of the present invention.

FIG. 14 is a flowchart describing the processing steps of making a recovery notification when the job is recovered from an error in the first embodiment. The CPU 200 loads the system software stored in the HDD 203 into the RAM 201 and executes the following processing.

First, it is determined whether there is a device that has received the error notification (S1401). If there is no device that has received it, the processing is terminated. If there is a device that has received it (S1401: Yes), the destination is specified (S1402), and a recovery notification is transmitted to the device (S1403). The CPU 200 in step S1403 functions as the recovery notifying unit that transmits the recovery notification to the device. Specifically, when DeviceC is recovered, the DeviceC transmits the recovery notification to DeviceB designated by DEST_DEVICE of PROCESS2 in accordance with the workflow setting information 500a. DeviceB transmits the recovery notification to DeviceD designated by DEST_DEVICE of PROCESS1 in accordance with the workflow setting information 500b. In this way, the recovery notification is transmitted through the plurality of devices from one device to another.

Subsequent to the notification by the recovery notifying unit, it is determined whether another destination is present (S1404). If another destination is present, the CPU 200 refers to the destination (S1405) and moves to S1402. If no other destination is present, (S1401: No), the processing is terminated.

FIG. 15 is a flowchart describing the processing of a device that has received the recovery notification in the first embodiment. The CPU 200 loads the system software stored in the HDD 203 into the RAM 201 and executes the following processing.

Upon reception of the recovery notification from another device (S1501), it is determined whether there is a job whose status is "interrupted" from the job table (S1502). If there is no interrupted job, the processing moves to S1504. If an interrupted job is present, the processing of the job is restarted (S1503). The CPU 200 in step S1503 functions as a processing restarting unit that restarts the interrupted processing step.

Subsequently, it is determined whether another interrupted job remains (S1504). If a job remains, the job is designated (S1505), and the processing of the job is also restarted. If no job remains, the processing is terminated. Subsequently, the CPU 200 transmits the notification also to a device that has executed the workflow processing before. Since the operation of the notification is the same as that described in the flowchart in FIG. 14, a detailed description thereof will be omitted.

The first embodiment offers the following advantages:

(1) Even if an error occurs in a first device during workflow processing, an error notification is transmitted from the first device to a second device, and the processing of the job in the second device is interrupted, so that a load on the entire system due to the error can be reduced. The second device that has received the error notification further transmits the error notification to another device, so that a load on the entire system due to the error can be reduced.

(2) Since the interrupted processing step is saved as a job, the processing of the job can be restarted soon after the first device is recovered, allowing efficient operation of the workflow system.

(3) If an error occurs, the processing of the job is interrupted quickly, and an error notification is transmitted to another device, which prevents input of a new job, allowing efficient operation of the workflow system thereafter.

Second Embodiment

The second embodiment of the present invention is configured to specify the destination of an error notification and the job to be interrupted in the workflow interrupting processing using a workflow ID at the occurrence of an error. Since the configurations of the workflow system and the workflow execution apparatus according to the second embodiment are the same as in FIGS. 1 to 7 in the first embodiment, detailed descriptions thereof will be omitted.

In the second embodiment, the fundamental processing of the workflow, processing at the occurrence of an error, and processing at the recovery from the error are the same as in FIGS. 8 and 9 and FIGS. 13 to 15, detailed descriptions thereof will be omitted. The workflow setting information is the same as in the first embodiment in that it defines the sequence of the processing of the job including a plurality of processing steps.

Figure 16:
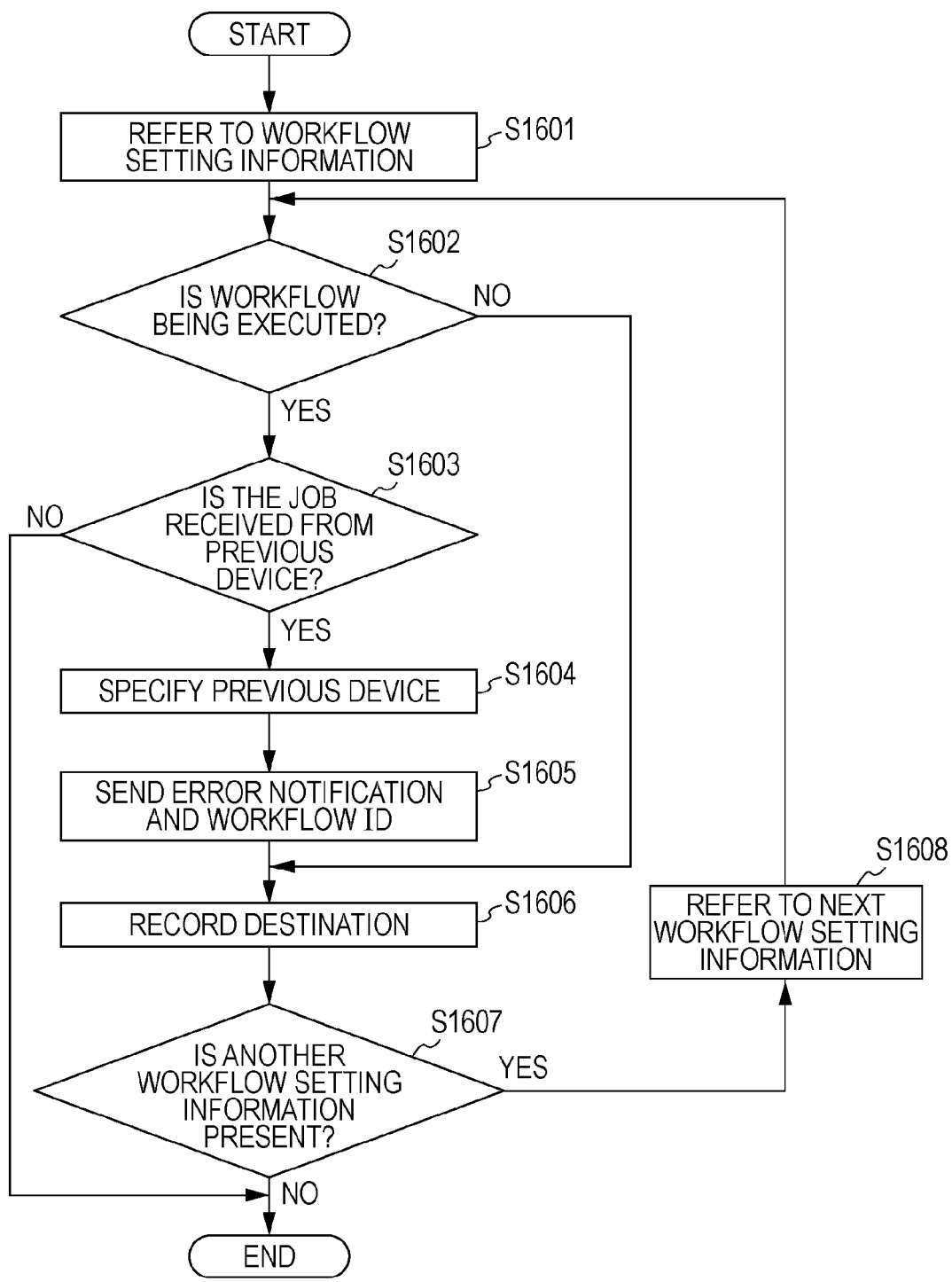
FIG. 16 is a flowchart describing the processing of making an error notification in the workflow processing according to a second embodiment of the present invention.

FIG. 16 is a flowchart describing the processing steps of making an error notification in the workflow processing of a workflow execution apparatus and a workflow execution method according to the second embodiment. The CPU 200 loads the system software stored in the HDD 203 into the RAM 201 and executes the following processing.

First, the CPU 200 refers to workflow setting information (S1601) and determines whether the workflow is being executed (S1602). The CPU 200 in steps S1601 and S1602 functions as a searching unit that searches for workflow setting information including an error processing step. As a result of searching by the searching unit, if the workflow setting information does not include processing in the error device, the process moves to S1606. In contrast, if the workflow setting information includes processing in the error device, it is determined whether the job is received from another device with reference to the workflow setting information (S1603).

In step S1603, if the job is not received from another device, the processing is terminated. If the job is received from another device, the device that has transmitted the job is specified (S1604). The CPU 200 in step S1605 functions as a device specifying unit that specifies another device that executed the previous processing step. Subsequently, an error notification is transmitted to the device specified by the device specifying unit (S1605). The CPU 200 in step S1605 functions as an error notifying unit that transmits the error notification to another device. The error notification includes a workflow ID and information that specifies the device, such as an IP address and a device ID.

When the error notifying unit transmits the error notification, the CPU 200 stores information on the destination device (S1606). The CPU 200 in step S1606 functions as a storage unit that stores the destination device to which the error notification is transmitted.

Subsequent to the storage by the storage unit, it is determined whether another workflow setting information is stored in the device (S1607). If another workflow setting information is stored, the CPU 200 refers to the workflow setting information (S1608) and moves to S1602. If there is no another workflow setting information, the processing is terminated.

Figure 17:
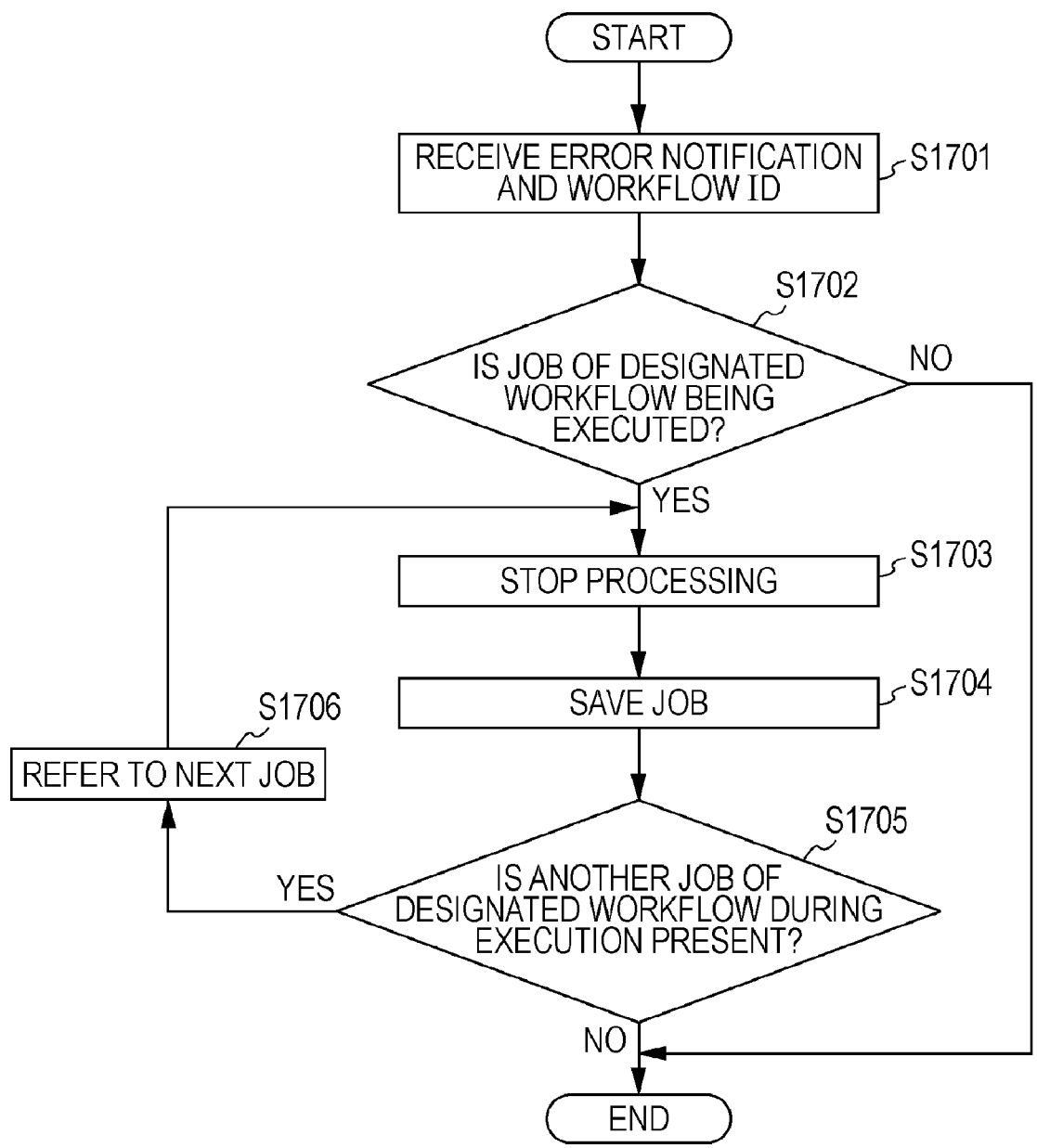
FIG. 17 is a flowchart describing the processing of a device that has received the error notification according to the second embodiment of the present invention.

FIG. 17 is a flowchart describing the processing steps of the device that has received the error notification of the workflow processing in the second embodiment. The CPU 200 loads the system software stored in the HDD 203 into the RAM 201 and executes the following processing.

First, the CPU 200 receives the error notification from another device (S1701). The CPU 200 in step S1701 functions as a notification receiving unit that receives the error notification. After the reception by the notification receiving unit, it is determined whether the job of the workflow designated by a workflow ID included in the error notification is being executed using the job table (S1702). Specifically, in the case of the workflow setting information 500a, the workflow ID is set at 0001. The workflow ID, 0001, is searched for from the job table shown in FIG. 7. If 0001 is present in the job table, then it is determined whether its status is being executed. The CPU 200 in step S1702 functions as a determining unit that determines whether the processing step is being executed.

As a result of the determination by the determining unit, if the workflow is not being executed, the processing is terminated. If the workflow is being executed, the processing is interrupted (S1703). The CPU 200 in step S1703 functions as a processing interrupting unit that interrupts a processing step being executed.

Subsequently, the job being executed is saved (S1704). The CPU 200 in step S1704 functions as a job saving unit that saves the interrupted processing step as a job. The saving of the job includes saving a document to be processed in a specified region of the HDD 203 and changing the status in the job table to "interrupted". The CPU 200 in step S1704 functions as a processing interrupting unit that interrupts a processing step being executed when an error occurs.

Subsequently, it is determined whether there is a job that is processed by the same workflow (S1705). If there is a job being processed, the CPU 200 refers to the job (S1706) and moves to S1703. In contrast, if there is no job being processed, the processing is terminated. Thereafter, a notification is also transmitted to the previous device that has executed the workflow processing before. Since the processing of notification is the same as that shown in FIG. 16, a detailed description thereof will be omitted.

The second embodiment offers the same advantages as the first embodiment and can interrupt the processing of a job at the occurrence of an error using the processing interrupting unit because it determines a job being processed using a workflow ID.

Other Embodiments

In the foregoing embodiments, the first device in which an error has occurred and the second device that receives an error notification are different workflow execution apparatuses; alternatively, one workflow execution apparatus may have the function of the first device which transmits an error notification when an error occurs and the function of the second device that interrupts processing when receiving the error notification.

The purpose of the present invention can also be realized by executing the following process. That is, a process in which a recording medium, in which a program code of a software that realizes the functions of the above-described embodiments is recorded, is supplied to the system or apparatus, and then a computer of the system or apparatus (such as CPU or MPU) reads out the program code stored in the recording medium. In such a case, the program code read out from the recording medium itself realizes the functions of the above-described embodiments, and the recording medium where the program code is stored as well as the program code are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-182837 filed on Jul. 14, 2008, which is hereby incorporated by reference herein in its entirety.

What is claimed is:

1. A workflow execution apparatus that processes a plurality of processing steps in accordance with workflow setting information that defines a sequence of processing, the apparatus comprising:
    a processing interrupting unit configured, if an error has occurred in any of the plurality of processing steps of a first device, to interrupt a processing step in which the error has occurred;
    a searching unit configured to search the workflow setting information including the processing step interrupted by the processing interrupting unit;
    a device specifying unit configured to specify a second device in which another processing step other than the processing step interrupted by the processing interrupting unit among the plurality of processing steps included in the searched workflow setting information is executed;
    an error notifying unit configured to transmit an error notification to the second device;
    a processing restarting unit configured to restart the processing step interrupted by the processing interrupting unit when it is recovered from the error; and
    a recovery notifying unit configured to transmit a recovery notification to the second device.

2. The workflow execution apparatus according to claim 1, further comprising:
    a notification receiving unit configured to receive the error notification; and
    a determining unit configured to determine whether the processing step included in the workflow setting information searched by the searching unit is being executed; and
    wherein when the notification receiving unit receives the notification, the processing interrupting unit interrupts the processing step that is determined to be being executed by the determining unit.

3. The workflow execution apparatus according to claim 1, further comprising:
    a job saving unit configured to save the processing step interrupted by the processing interrupting unit as a job.

4. The workflow execution apparatus according to claim 2, wherein when the notification receiving unit receives a notification that the second device has recovered, the processing restarting unit restarts the interrupted processing step.

5. The workflow execution apparatus according to claim 1, wherein the error notification is given to a user.

6. The workflow execution apparatus according to claim 1, wherein the error notifying unit includes a storage unit that stores information that specifies the second device to which the error notification is transmitted.

7. A non-transitory computer-readable storage medium in which a program for executing a method for controlling the workflow execution apparatus according to claim 1 is stored.

8. A workflow execution method for executing a plurality of processing steps with a plurality of devices in accordance with workflow setting information that defines a sequence of processing, the method comprising the steps of:
  interrupting a processing step being executed when an error occurs in a first device;
  searching the workflow setting information including the processing step in the first device in which the error has occurred;
  specifying a second device in which another processing step included in the searched workflow setting information is executed;
  giving a notification that the error has occurred in the first device to the second device;
  restarting the interrupted processing step when the first device is recovered; and
  giving a notification that the first device has recovered to the second device.

9. The workflow execution method according to claim 8, further comprising the steps of;
  receiving the notification by the second device;
  searching the workflow setting information including the processing step in the first device by the second device;
  determining whether the processing step included in the workflow setting information searched by the second device is being executed; and
  interrupting the processing step that is determined to be being executed when the second device receives the notification.

10. The workflow execution method according to claim 8, further comprising the step of saving the processing step interrupted in the first device as a job.

11. The workflow execution method according to claim 9, further comprising the step of saving the processing step interrupted in the second device as a job.

12. The workflow execution method according to claim 8, further comprising the step of restarting the interrupted processing step when the second device receives a notification that the first device has recovered.

13. The workflow execution method according to claim 8, further comprising the step of notifying the user of the fact that the error has occurred in the first device.

14. The workflow execution method according to claim 8, further comprising the step of storing the second device to which the error notification is transmitted.

* * * * *